(12) United States Patent
Waskie et al.

(10) Patent No.: US 9,527,531 B2
(45) Date of Patent: Dec. 27, 2016

(54) ENERGY ABSORBING BRACKET

(71) Applicant: GM GLOBAL TECHNOLOGY OPERATIONS LLC, Detroit, MI (US)

(72) Inventors: David B. Waskie, Shelby Township, MI (US); Jason M. Miller, St. Clair Shores, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/724,868

(22) Filed: May 29, 2015

(65) Prior Publication Data

US 2016/0347372 A1    Dec. 1, 2016

(51) Int. Cl.
*B62D 25/16*    (2006.01)
*B60R 21/34*    (2011.01)
*B62D 21/15*    (2006.01)

(52) U.S. Cl.
CPC .......... *B62D 21/152* (2013.01); *B60R 21/34* (2013.01); *B62D 25/163* (2013.01)

(58) Field of Classification Search
CPC ....... B60R 21/34; B62D 21/152; B62D 25/08; B62D 25/082; B62D 25/10; B62D 25/105; B62D 25/12; B62D 25/16; B62D 25/163

USPC ............ 296/30, 187.01, 187.03, 187.04, 198
See application file for complete search history.

(56) References Cited

U.S. PATENT DOCUMENTS

| | | | |
|---|---|---|---|
| 7,204,545 B2* | 4/2007 | Roux | B60R 21/34 296/187.04 |
| 8,182,027 B2* | 5/2012 | Steinhilb | B62D 25/163 296/187.03 |
| 8,944,495 B2* | 2/2015 | Tsuneyama | B62D 25/163 296/193.09 |

* cited by examiner

*Primary Examiner* — Jason S Daniels
(74) *Attorney, Agent, or Firm* — Quinn Law Group

(57) ABSTRACT

An absorbing bracket can be coupled to a vehicle body and can absorb energy from an external force applied to the vehicle body. In an embodiment, the energy absorbing bracket includes a bracket body at least partly made of a rigid material. The bracket body includes a deformable wall defining a first edge and a second edge opposite the first edge. The first edge is parallel to the second edge. The bracket body defines a plurality of slots extending through the deformable wall. Each slot extends along a slot axis. Further, each slot axis is obliquely angled relative to the first edge.

17 Claims, 2 Drawing Sheets

ENERGY ABSORBING BRACKET

TECHNICAL FIELD

The present disclosure relates to an energy absorbing bracket for a vehicle.

BACKGROUND

Vehicles may sometimes be subjected to external forces. If an external force is exerted on the vehicle, some vehicles may manage the energy of that external force. For instance, some vehicles can absorb at least some of the energy of the external force applied to the vehicle body. To achieve this, some vehicles employ, for example, have hood bumpers that serve as buffers between an object and a vehicle engine compartment.

SUMMARY

The presently disclosed energy absorbing bracket can be coupled to a vehicle body and can absorb energy from an external force applied to the vehicle body. In an embodiment, the energy absorbing bracket includes a bracket body at least partly made of a rigid material. The bracket body includes a deformable wall defining a first edge and a second edge opposite the first edge. The first edge is parallel to the second edge. The bracket body defines a plurality of slots extending through the deformable wall. Each slot extends along a slot axis. Further, each slot axis is obliquely angled relative to the first edge. The present disclosure further describes a vehicle including the energy absorbing bracket.

The above features and advantages and other features and advantages of the present teachings are readily apparent from the following detailed description of the best modes for carrying out the teachings when taken in connection with the accompanying drawings.

DETAILED DESCRIPTION

Figure 1:
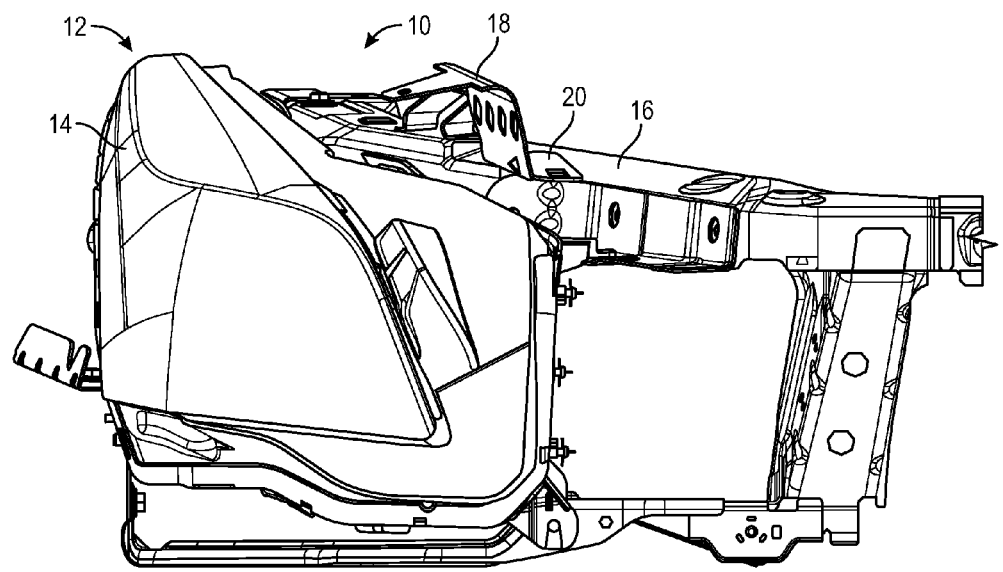
FIG. 1 is a schematic, fragmentary, perspective view of a vehicle including an energy absorbing bracket in accordance with an embodiment of the present disclosure.
Figure 2:
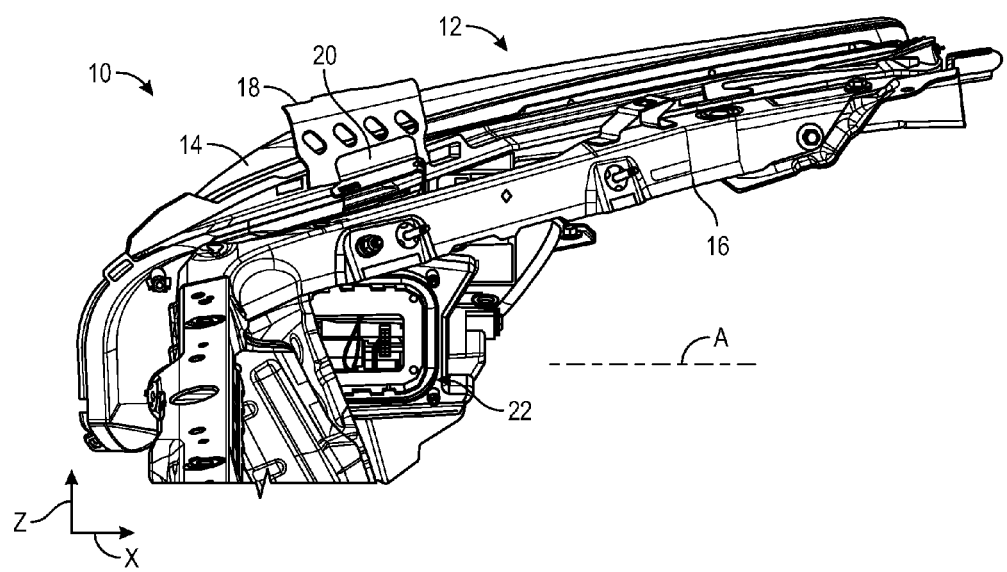
FIG. 2 is a schematic, fragmentary, side view of the vehicle shown in FIG. 1.

Referring to the drawings, wherein like reference numbers correspond to like or similar components throughout the several figures, and beginning with FIGS. 1 and 2, a vehicle 10 includes a vehicle body 12. The vehicle body 12 may include a fender 14 and a frame 16 coupled to the fender 14. Moreover, the vehicle body 12 defines a horizontal or longitudinal axis A extending between the first or fore-aft direction X of the vehicle 10. The vehicle 10 further includes an energy absorbing bracket 18 coupled to the vehicle body 12. In the depicted embodiment, the energy absorbing bracket 18 is welded to a body flange 20 of the fender 14 above a lamp assembly 22 of the vehicle 10. In particular, the energy absorbing bracket 18 is coupled to the vehicle body 12 such that it extends in a second or vertical direction Z from the body flange 20. As a consequence, the energy absorbing bracket 18 is adequately positioned to receive external forces applied to the vehicle body 12. The second direction Z is perpendicular to the first direction X. It is contemplated that the energy absorbing bracket 18 may be coupled to other parts of the vehicle body 12. For example, the energy absorbing bracket 18 can be fastened (e.g., bolted, riveted) to the hood bumper, the headlamp, or any other suitable part of the vehicle body 12.

Figure 3:
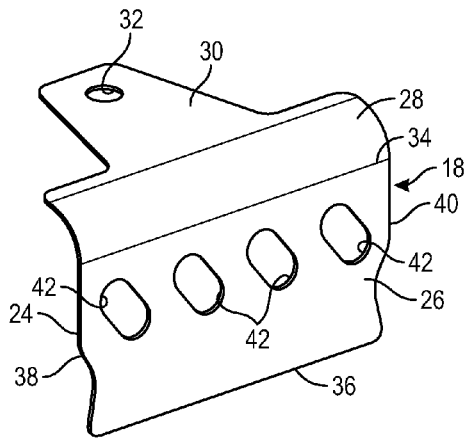
FIG. 3 is a schematic, perspective view of the energy absorbing bracket shown in FIG. 1.
Figure 4:
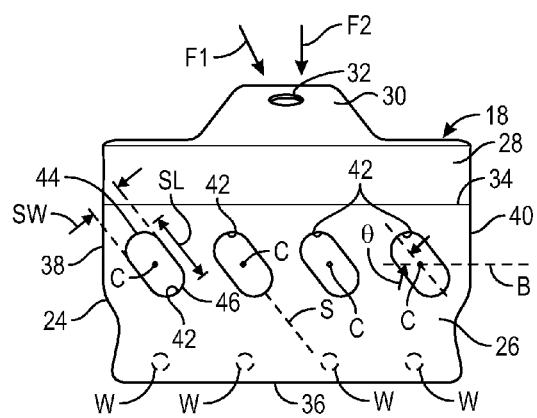
FIG. 4 is a schematic, front view of the energy absorbing bracket shown in FIG. 3.
Figure 5:
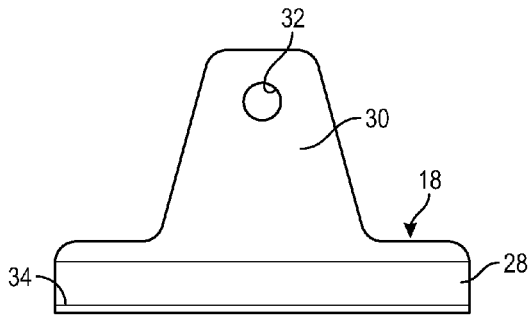
FIG. 5 is a schematic, top view of the energy absorbing bracket shown in FIG. 3.

With reference to FIGS. 3-5, the energy absorbing bracket 18 includes a bracket body 24 wholly or partly made of a rigid material, such as a rigid metal or a rigid polymer, in order to allow the energy absorbing bracket 18 to absorb energy from a slanted external force F1 or a normal force F2. The bracket body 24 includes a deformable wall 26, a connecting wall 28 coupled to the deformable wall 26, and a bracket flange 30 extending directly from the connecting wall 28. The connecting wall 28 may directly interconnect the deformable wall 26 and the bracket flange 30. The bracket flange 30 may define a flange hole 32 extending therethrough. The flange hole 32 may be configured, shaped, and sized to receive a fastener, such as a bolt, in order to couple the bracket flange 30 to another vehicle component. The bracket flange 30 is perpendicular relative to the deformable wall 26 in order to be adequately positioned to receive the slanted external force F1 or the normal external force F2. The connecting wall 28 may be entirely or partially curved in order to allow the bracket flange 30 to be perpendicular relative to the deformable wall 26.

The deformable wall 26 defines a first or top edge 34 and a second or bottom edge 36 opposite the first edge 34. The connecting wall 28 may be coupled to the deformable wall 26 along an entirety of the first edge 34. In the depicted embodiment, the first edge 34 is parallel to the second edge 36. However, it is envisioned that at least a portion of the first edge 34 may not be parallel to the second edge 36. The deformable wall 26 further defines a third edge 38 and a fourth edge 40 opposite the third edge 38. The third edge 38 interconnects the first edge 34 and the second edge 36. The fourth edge also interconnects the first edge 34 and the second edge 36.

The bracket body 24 defines at least one slot 42 extending through the deformable wall 26. In the depicted embodiment, the bracket body 24 has four slots 42. However, the number and size of the slots 42 may be tuned depending on the structural characteristics of the vehicle body 12 and on the magnitude of the slanged external force F or the normal external force F2. The bracket body 24 defines a horizontal or linear axis B, which may be parallel to the first edge 34 and/or the second edge 36. The slots 42 are arranged along a linear row that extends along the linear axis B between the third edge 38 and the fourth edge 40. Each slot 42 has a slot width SW and a slot length SL, which is a dimension perpendicular to the slot length SL. The slot length SL extends from a first or top slot end 44 to a second or bottom slot end 46, which is opposite the first slot end 44. Each slot 42 has a slot center C (i.e., center point), which is at the middle of the slot length SL and the slot width SW. The linear axis B may intersect the slot center C of each slot 42.

Each slot 42 extends (i.e., is elongated) along a slot axis S, which is parallel to the slot length SL. Each slot axis S intersects the slot center C of the corresponding slot 42. In the depicted embodiment, the slot length SL may range between ten millimeters and twenty millimeters, thereby allowing the deformable wall 26 to deform (e.g., bend) when the energy absorbing bracket 18 receives the slanted external force F1 and/or the normal external force F2. For instance, the slot length SL may be about twenty millimeters. The slot width SW may range between five millimeters and fifteen millimeters, thereby allowing the deformable wall 26 to deform (e.g., bend) when the energy absorbing bracket 18 receives the slanted external force F1 and/or the normal external force F2. For example, the slot width SW may be about ten millimeters. However, the slot width SW and the slot length SL of the slots 42 may be tuned depending on the structural characteristics of the vehicle 10 and on the magnitude of the slanted external force F1 or the normal external force F2. In the depicted embodiment, the slots 42 are parallel to one another and equal in size in order to achieve a uniform deformation of the deformable wall 26.

All of the slots 42 in the deformable wall 26 may be arranged substantially parallel to each other. In other words, the slot axes S of the slots 42 are parallel to each other in order to maximize the deformation of the deformable wall 26 when the energy absorbing bracket 18 receives the slanted external force F1 and/or the normal external force F2. When the slanted external force F1 and/or the normal external force F2 are applied to the energy absorbing bracket 18, the deformation of the deformable wall 26 should be maximized in order to allow the energy absorbing bracket 18 to absorb the maximum amount of energy from the slanted external force F1 and/or the normal external force F2. At least one of the slot axes S is obliquely angled relative to the linear axis B, the first edge 34 and/or the second edge 36 of the deformable wall 26 in order to maximize deformation of the deformable wall 26 when the energy absorbing bracket 18 receives the slanted external force F1. In the depicted embodiment, all the slot axes S are parallel to one another and are obliquely angled relative to the linear axis B, the first edge 34 and/or the second edge 36 of the deformable wall 26. In the depicted embodiment, an oblique angle θ is defined between the linear axis B and each of the slot axes S. The oblique angle θ may range between thirty-three degrees and seventy-three degrees in order to maximize the deformation of the deformable wall 26 when the energy absorbing bracket 18 receives the slanted external force F1. For example, the oblique angle θ may be about fifty-three degrees in order to maximize the deformation of the deformable wall 26 when the energy absorbing bracket 18 receives the slanted external force F1.

As discussed above, the energy absorbing bracket 18 can be welded to a part of the vehicle body 12, such as the body flange 20 (FIG. 2). Specifically, the deformable wall 26 can be spot welded to the body flange 20 (FIG. 2) at the spot welds W. The spot welds W are arranged in a linear row along the second edge 36 of the deformable wall 26. Therefore, the spot welds W are closer to the second edge 36 than to the first edge 34 of the deformable wall 26. Further, each spot weld W is substantially aligned with one of the slots 42. The location and orientation of the spot welds W described above can help the deformable wall 26 deform mostly near the slots 42, thereby inhibiting the transfer of force to another part of the vehicle body 12 through the second edge 36 of the deformable wall 26.

When the slanted external force F1 and/or the normal external force F2 are applied to the energy absorbing bracket 18, the deformable wall 26 deforms around the slots 42. Specifically, when the energy absorbing bracket 18 receives the slanted external force F1 and/or the normal external force F2, the slots 42 may change in size (e.g., expand) in order to allow deformable wall 26 to deform and absorb energy. Accordingly, the stress concentrates near the slots 42 when the slanted external force F1 and/or the normal external force F2 are applied to the energy absorbing bracket 18. The deformation of the deformable wall 26 prevents, or at least inhibits, force transfer to other parts of the vehicle body 12.

Figure 6:
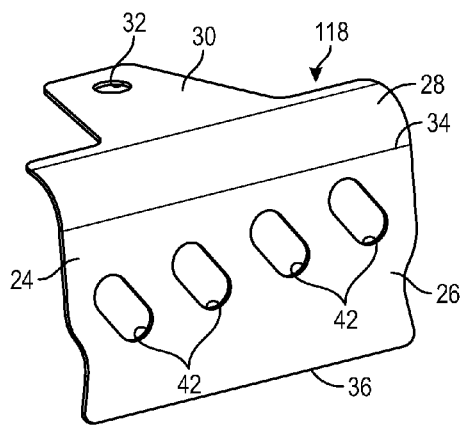
FIG. 6 is a schematic, perspective view of an energy absorbing bracket in accordance with another embodiment of the present disclosure.
Figure 7:
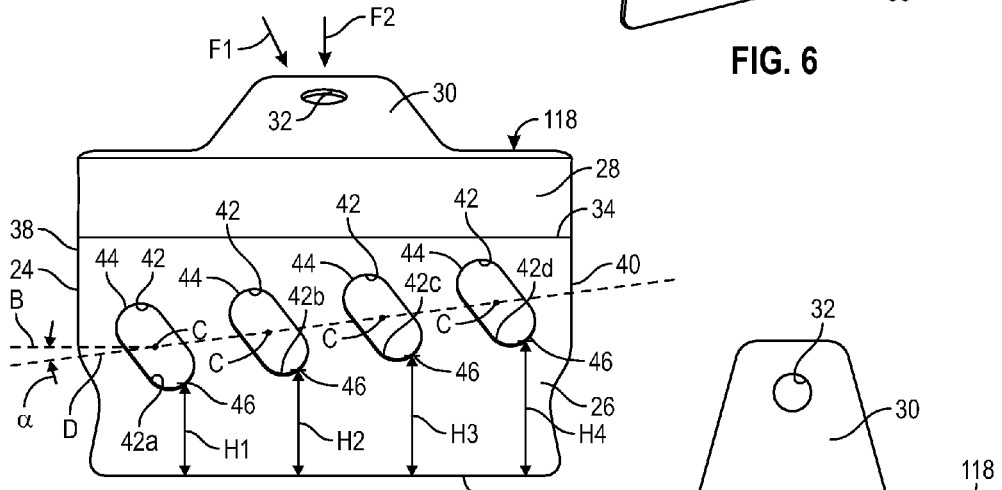
FIG. 7 is a schematic, front view of the energy absorbing bracket shown in FIG. 5.
Figure 8:
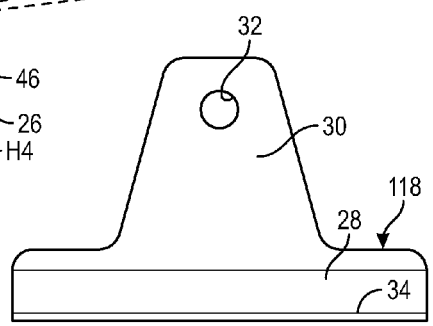
FIG. 8 is a schematic, top view of the energy absorbing bracket shown in FIG. 5.

FIGS. 6-8 schematically illustrate an energy absorbing bracket 118 in accordance with another embodiment of the present disclosure. The structure and operation of the energy absorbing bracket 118 is substantially similar to the structure and operation of the energy absorbing bracket 18 described above. In the interest of brevity, the differences between the energy absorbing bracket 118 and the energy absorbing bracket 18 are described below. Instead of being arranged along a linear axis B that is parallel to the first edge 34, the slots 42 are arranged in a stepped configuration between the third edge 38 and the fourth edge 40 of the deformable wall 26. The stepped configuration of the slots 42 helps maximize the deformation of the deformable wall 26 when the energy absorbing bracket 18 receives the slanted external force F1. In this embodiment, the horizontal or linear axis B may be referred to as the first linear axis B. The first linear axis B may be parallel to the first edge 34 and/or the second edge 36 of the deformable wall 26. Because of the stepped configuration, the slots 42 are arranged along a second linear axis D, which intersects the slot center C of each of the slots 42. The second linear axis D is obliquely angled relative to the first linear axis B. The first linear axis B intersects the slot center C of only one slot 42, whereas the second linear axis D intersects the slot center C of each of the slots 42. An oblique angle α is defined between the first linear axis B and the second linear axis D. The oblique angle α may range between seventeen degrees and fifty-seven degrees in order to maximize the deformation of the deformable wall 26 when the energy absorbing bracket 18 receives the slanted external force F1. For example, the oblique angle α may be about thirty-seven degrees.

In this embodiment, the slots 42 are designated as the first slot 42a, the second slot 42b, the third slot 42c, and the fourth slot 42d in order from the third edge 38 to the fourth edge 40. Consequently, the first slot 42a and the second slot 42b are closer to the third edge 38 than to the fourth edge 40 of the deformable wall 26. The third slot 42c and the fourth slot 42d are closer to the fourth edge 40 than to the third edge 38 of the deformable wall 26. The first slot 42a is closer to the third edge 38 of the deformable wall 26 than the second slot 42b. The fourth slot 42d is closer to the fourth edge 40 of the deformable wall 26 than the third slot 42c.

Because of the stepped configuration, the slots 42 are spaced at different heights from the second edge 36 of the deformable wall 26. In the depicted embodiment, the distance (e.g., second height H2) from the second edge 36 to the second slot end 46 of the second slot 42b is greater than the distance (e.g., first height H1) from the second edge 36 to the second slot end 46 of the first slot 42a. The distance (e.g., third height H3) from the second edge 36 to the second slot end 46 of the third slot 42c is greater than the distance (e.g., second height H2) from the second edge 36 to the second slot end 46 of the second slot 42b. The distance (e.g., fourth height H4) from the second edge 36 to the second slot end 46 of the fourth slot 42d is greater than the distance (e.g., third height H3) from the second edge 36 to the second slot end 46 of the third slot 42c.

While the best modes for carrying out the teachings have been described in detail, those familiar with the art to which this disclosure relates will recognize various alternative designs and embodiments for practicing the teachings within the scope of the appended claims.

The invention claimed is:

1. An energy absorbing bracket, comprising:
a bracket body including a deformable wall, wherein the deformable wall defines a first edge and a second edge opposite the first edge, the first edge is parallel to the second edge, the bracket body defines a plurality of slots extending through the deformable wall, and each of the slots extends along a slot axis, and each of the slot axes is obliquely angled relative to the first edge, and the plurality of slots are disposed between the first edge and the second edge.

2. The energy absorbing bracket of claim 1, wherein the slots are equal in size.

3. The energy absorbing bracket of claim 1, wherein the slots are parallel to one another.

4. The energy absorbing bracket of claim 1, wherein the deformable wall further defines a third edge that interconnects the first edge and the second edge, and a fourth edge opposite the third edge that interconnects the first edge and the second edge, the bracket body defines a linear axis extending between the third edge and the fourth edge, the linear axis is parallel to the first edge, wherein each of the slots are arranged along the linear axis between the third edge and the fourth edge such that the linear axis intersects a center point of each of the slots.

5. The energy absorbing bracket of claim 1, wherein the bracket body is at least partially made of a rigid material.

6. The energy absorbing bracket of claim 5, wherein each of the slots has a first slot end and a second slot end opposite to the first slot end defining a slot length extending from the first slot end to the second slot end, the slot length is substantially parallel to the slot axis and is about twenty millimeters.

7. The energy absorbing bracket of claim 1, wherein the deformable wall further defines a third edge, and a fourth edge opposite the third edge, the third edge interconnects the first edge and the second edge, the fourth edge interconnects the first edge and the second edge, and the plurality of slots are arranged in a stepped configuration between the third edge and the fourth edge.

8. The energy absorbing bracket of claim 7, wherein the bracket body defines a first linear axis and a second linear axis extending between the third edge and the fourth edge, wherein each of the slots are arranged along the first linear axis and the second linear axis between the first edge and the second edge such that the second linear axis intersects a center point of each of the slots and the second linear axis is obliquely angled relative to the first linear axis.

9. The energy absorbing bracket of claim 8, wherein the first linear axis intersects the center point of one of the slots.

10. The energy absorbing bracket of claim 9, wherein each of the slots has a slot width, and the slot width is about ten millimeters.

11. A vehicle, comprising:
a vehicle body;
an energy absorbing bracket coupled to the vehicle body, wherein the energy absorbing bracket includes:
a bracket body including a deformable wall defining a first edge and a second edge opposite the first edge, wherein the bracket body defines a plurality of slots extending through the deformable wall, and each of the slots extends along a slot axis, and each of the slot axes is obliquely angled relative to the first edge;
wherein the deformable wall further defines a third edge and a fourth edge opposite the third edge, the third edge interconnects the first edge and the second edge, the fourth edge interconnects the first edge and the second edge, the plurality of slots are arranged in a stepped configuration between the third edge and the fourth edge; and
wherein the bracket body defines a first linear axis extending between the first edge and the second edge, the first linear axis is parallel to the third edge, the slots are arranged along a second linear axis between the first edge and the second edge, the second linear axis intersects a slot center of each of the slots, and the second linear axis is obliquely angled relative to the first linear axis.

12. The vehicle of claim 11, wherein the slots are equal in size.

13. The vehicle of claim 11, wherein the slots are parallel to one another.

14. The vehicle of claim 11, wherein the bracket body is at least partially made of a rigid material.

15. The vehicle of claim 14, wherein each of the slots has a first slot end and a second slot end opposite to the first slot end defining a slot length extending from the first slot end to the second slot end, the slot length is substantially parallel to the slot axis and is about twenty millimeters.

16. The vehicle of claim 11, wherein the first linear axis intersects the slot center of one of the slots.

17. The vehicle of claim 16, wherein each of the slots has a slot width, and the slot width is about ten millimeters.

* * * * *